(12) United States Patent
Brown et al.

(10) Patent No.: US 9,274,837 B2
(45) Date of Patent: Mar. 1, 2016

(54) ASSIGNING LEVELS OF POOLS OF RESOURCES TO A SUPER PROCESS HAVING SUB-PROCESSES

(71) Applicant: International Business Machines Corporation, Armonk, NY (US)

(72) Inventors: Theresa M. Brown, Tucson, AZ (US); Suguang Li, Tucson, AZ (US); Mark L. Lipets, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 256 days.

(21) Appl. No.: 13/897,238

(22) Filed: May 17, 2013

(65) Prior Publication Data

US 2014/0344828 A1 Nov. 20, 2014

(51) Int. Cl.
*G06F 9/50* (2006.01)
*G06F 17/30* (2006.01)

(52) U.S. Cl.
CPC ............. *G06F 9/5011* (2013.01); *G06F 9/50* (2013.01); *G06F 9/5005* (2013.01); *G06F 9/5022* (2013.01); *G06F 17/30575* (2013.01); *G06F 2209/5011* (2013.01)

(58) Field of Classification Search
None
See application file for complete search history.

(56) References Cited

U.S. PATENT DOCUMENTS

| 2004/0139142 | A1* | 7/2004 | Arwe | 709/200 |
|---|---|---|---|---|
| 2005/0240928 | A1 | 10/2005 | Brown et al. | |
| 2010/0242044 | A1* | 9/2010 | Osborne et al. | 718/104 |
| 2011/0154322 | A1 | 6/2011 | Nayar et al. | |
| 2014/0181015 | A1* | 6/2014 | Bonzini | 707/613 |

* cited by examiner

*Primary Examiner* — Qing Wu
(74) *Attorney, Agent, or Firm* — David W. Victor; Konrad Raynes Davda & Victor LLP (57) ABSTRACT

Provided are a computer program product, system, and method for assigning levels of pools of resources in an operating system to a super process having sub-processes. A plurality of first level pools of resources are reserved in the operating system for first level processes to perform a first level operation and invoke at least one second level process to perform a second level operation. A plurality of second level pools of resources are reserved in the operating system for second level processes. One of the second level pools of resources assigned to one of the second level processes is released and available to assign to another second level process when the second level process completes the second level operation for which it was invoked.

23 Claims, 7 Drawing Sheets

FIG. 1

Resource Information

FIG. 2

Pool Information

FIG. 3

Process Information

FIG. 4

Pool Configuration Information

ASSIGNING LEVELS OF POOLS OF RESOURCES TO A SUPER PROCESS HAVING SUB-PROCESSES

1. FIELD OF THE INVENTION

The present invention relates to a computer program product, system, and method for assigning levels of pools of resources to a super process having sub-processes.

2. DESCRIPTION OF THE RELATED ART

An operating system invokes tasks to perform application and operating system operations. Each task is allocated an amount of system memory and resources, which remains allocated to the task even when the task is not running, such as not executing instructions. The operating system resource manager has a limited amount of resources, sometimes referred to as task control blocks (TCBs) that may be allocated to processes.

Certain types of processes, referred to as super processes, invoke multiple levels of sub-processes to carry out the super process operation. For instance, a first level process of the super process may invoke one or more sub-processes, and each sub-process may invoke one or more further sub-processes to perform the sub-process operation. To avoid deadlocks, the resource manager may reserve a pool of TCBs in advance for the super process and all its sub-processes so that the super process and sub-processes have a sufficient number of TCBs to complete without experiencing a deadlock.

SUMMARY

Provided are a computer program product, system, and method for assigning levels of pools of resources in an operating system to a super process having sub-processes. A plurality of first level pools of resources are reserved in the operating system for first level processes. Each of the first level processes are invoked to perform a first level operation and each of the first level processes are capable of invoking at least one second level process to perform a second level operation to perform a sub-operation of the first level operation. One of the first level pools of resources assigned to one of the first level processes is released and available to assign to another first level process when the first level process completes the first level operation for which it was invoked. A plurality of second level pools of resources are reserved in the operating system for second level processes invoked by the first level processes. One of the second level pools of resources assigned to one of the second level processes is released and available to assign to another second level process when the second level process completes the second level operation for which it was invoked.

DETAILED DESCRIPTION

Described embodiments provide techniques to reserve resources for a super process and sub-processes of the super process by forming level pools, containing resources, for different levels of processes of the super process, where a plurality of level pools are reserved for each of the level of sub-processes of the super process. Each resource level pool may include the minimum number of resources needed for the sub-process on this level and may only be assigned when the sub-process is invoked. By using pools with resources per each level of sub-processes, the assignment of pools of resources is minimized and limited to pools having only the number of the resources for the sub-process to complete without a deadlock.

Figure 1:
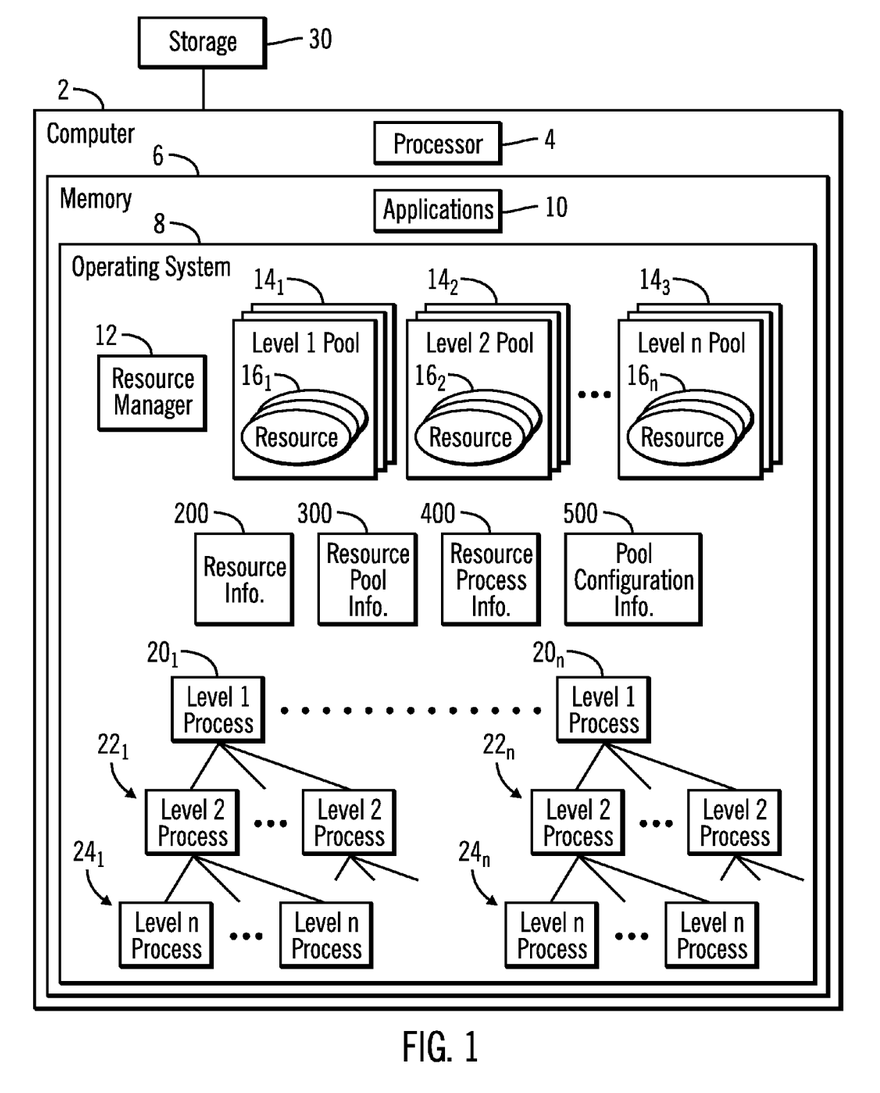
FIG. 1 illustrates an embodiment of a computing environment.

FIG. 1 illustrates an embodiment of a computing environment. A computer 2 includes a processor 4, which may comprise one or more processors and/or cores, and a memory 6 including programs executed by the processor 4, such as an operating system 8 8, and applications 10, etc. The operating system 8 includes a resource manager 12 to manage the allocation of resources to operating system 8 and application processes and threads. A resource comprises the data structure and information on operations performed by a process or sub-process, such as a TCB. A resource may comprise any structure or information the operating system 8 assigns to a process in order for the process to be managed and execute.

The resource manager 12 may organize resources in pools to assign to operating system 8 and application 10 processes, sub-processes and threads. Certain operating system 8 and application 10 processes may comprise a super process that comprises a first level process that invokes further level sub processes to perform operations for the super process. Each level process of the super process invoking a lower level process cannot complete until the lower level process completes. However, the higher level process may continue with additional parallel operations while the invoked sub-processes perform sub-process operations. For instance, for source volumes in copy relationships with target volumes, such as a snapshot copy relationship, mirror copy relationship, FlashCopy® relationship, etc., to perform a super process comprising a write to the source volume, the write super process may invoke a sub-process for each target volume in the copy relationship that must complete in order for the write on the source to complete. (FlashCopy is a registered trademark of International Business Machines Corporation in the United States and other countries). In further embodiments, the super processes may be processes for operating system, Input/Output I/O) manager, application, and device operations.

In one embodiment, the resource manager 12 may reserve pools of resources for a super process and its various sub-processes. If a super process may result in the invocation of n levels of sub-processes, then the resource manager may reserve one or more pools of resources for each level of processes, such as one or more of a level 1 pool $14_1$, level 2 pool $14_2$ through level n pool $14_n$, where each level pool $14_1$, $14_2 \ldots 14_n$ includes one or more resources $16_1, 16_2 \ldots 16_n$ comprising a minimum number of resources needed for that level process to complete. A first level 1 process $20_1 \ldots 20_n$ comprises the first process invoked as part of the super process, i.e., the first process called. Multiple first level 1 processes $20_1 \ldots 20_n$ may concurrently execute when assigned a level 1 pool $14_1$. Each level 1 process $20_1 \ldots 20_n$ may then invoke one or more second level 2 processes $22_1 \ldots 22_n$, and each level 2 process $22_1 \ldots 22_n$ may invoke one or more third level processes, and so on. A final level of processes $24_1 \ldots 24_n$ would not invoke any further level processes to complete. Each invoked level process requires that an available corresponding level pool $14_1, 14_2 \ldots 14_n$ be assigned to the level process to execute. If there is no available level i pool for the level i process, then the level i process must wait for a level i pool to become available before executing. Further, each level of processes and sub-processes may concurrently execute, such that a higher level process invoking a sub-process may concurrently execute while the invoked sub-process executes.

In described embodiments, the super processor or a sub-process thereof may invoke a variable number of further sub-processes. By maintaining separate pools for sub-processes, the resource manager 12 need only assign the minimum number of resource level pools to the sub-processes that are actually invoked by the higher level process, and not have to reserve resources for a maximum number of sub-processes that may possibly be invoked. In this way, by creating level pools of resources for different levels of sub-processes, the number of resources assigned to sub-processes is optimized by assigning only the minimal number of pools necessary for sub-processes based on the actual number of sub-processes the higher level process invokes.

The resource manager 12 may maintain pool information 300 having information on the level pools reserved for different level processes, task process information 400 having information on an invoked process, which may comprise a super process or one of the sub-processes, and pool reserve information 500 having configuration information on the number of level pools $14_1, 14_2 \ldots 14_n$ to reserve in advance.

In one embodiment, the memory 6 may comprise one or more volatile or non-volatile storage devices, such as a Dynamic Random Access Memory (DRAM), Random Access Memory (RAM) or a non-volatile memory, e.g., battery backed-up Random Access Memory (RAM), static RAM (SRAM), solid state storage devices (SSDs), etc.

The computer 2 may communicate Input/Output (I/O) requests to a storage 30 used by the computer 2. The storage 30 may comprise one or more storage devices known in the art, such as interconnected storage devices (e.g., configured as a DASD, RAID, JBOD, virtualized devices, etc.), as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The operating system 8 may comprise suitable operating systems known in the art, such as the International Business Machines ("IBM®") Z/OS® operating system, WINDOWS®, iOS®, OS X®, and ANDROID™. (IBM and Z/OS are trademarks of IBM in the United States and foreign countries, WINDOWS is a registered trademark of Microsoft Corporation in the U.S. and foreign countries, OS X is registered trademark of Apple Inc., iOS is a registered trademark of Cisco Systems Inc. and is used or licensed by Apple, and ANDROID is a trademark of Google, Inc.).

Programs and data loaded into the memory 6 for execution by the processor 4 may be stored in the storage 30 and loaded from the storage 30 into the memory 6 as needed.

Figure 2:
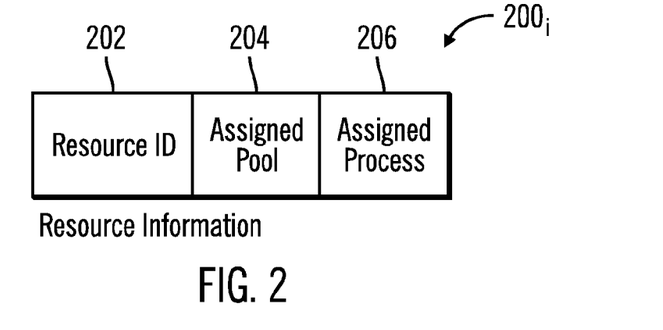
FIG. 2 illustrates an embodiment of resource information.

FIG. 2 illustrates an embodiment of an instance of resource information $200_i$ maintained for each resource configured in the system, including a resource identifier (ID) 202, an assigned pool 204 indicating a pool to which the resource is assigned or null if the resource is not assigned to a pool, and an assigned process 206 indicating a process or sub-process to which the resource is assigned if the resource $200_i$ is assigned to a process.

Figure 3:
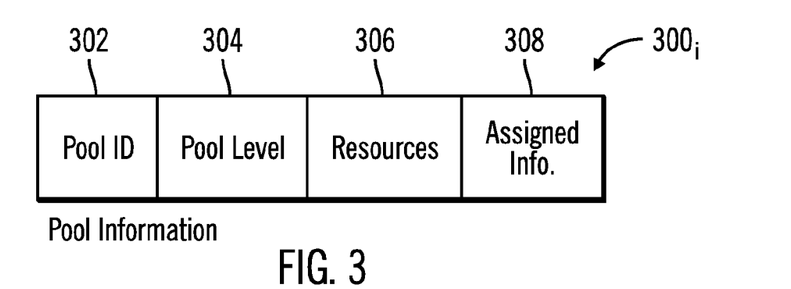
FIG. 3 illustrates an embodiment of pool information.

FIG. 3 illustrates an embodiment of an instance of pool information $300_i$ maintained for each resource level pool, including a pool identifier (ID) 302 comprising a unique identifier of the pool; a pool level 304 indicating the process level to which the pool is to be assigned; the resources 306 allocated to the pool 302, which may comprise the resource identifiers for which there is an instance of resource information 200i (FIG. 2); and assigned information 308 indicating the process ID to which the pool 302 is assigned or that the pool is unassigned. Each pool at a same level may have the same number of allocated resources 306. The resources 306 may indicate all the resources required to complete the sub-processes that could be invoked at the pool level 304. An available level pool is available for assignment to any level process in any super-process currently active.

Figure 4:
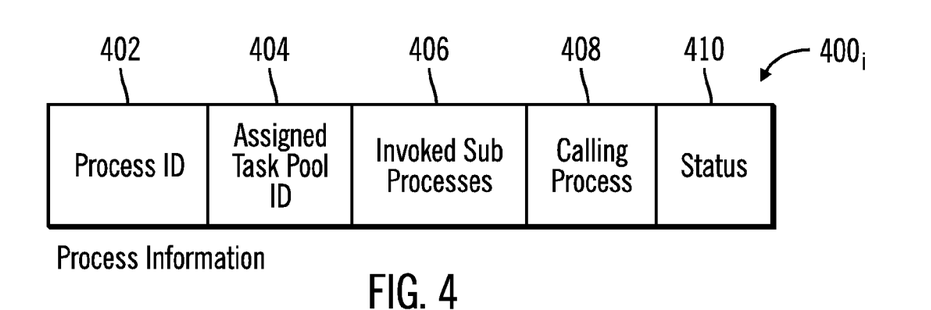
FIG. 4 illustrates an embodiment of process information.

FIG. 4 illustrates an embodiment of an instance of process information 400, maintained for each super process or sub-process executing in the operating system 8, including a process identifier (ID) 402 comprising a unique identifier of the process or sub-process; an assigned pool ID 404 identifying the pool $300_i$ assigned to the process 402; invoked sub processes 406 or immediately lower level processes invoked by the process 402 if any; a calling process 408 comprising an immediately higher level process that invoked the process 402 if the process 402 is itself a sub-process; and a status 410 of the process 402, such as executing, waiting to be assigned a pool, completed, etc.

Figure 5:
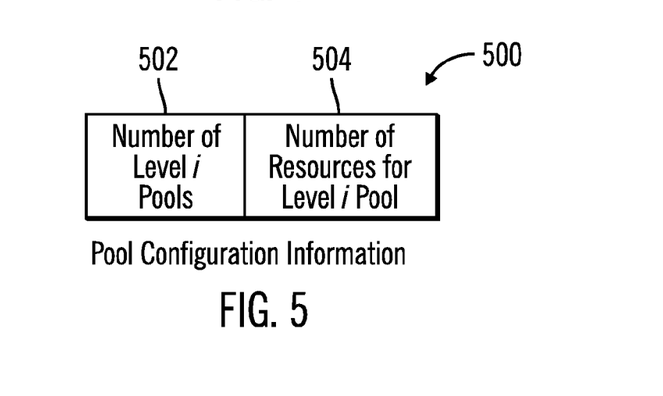
FIG. 5 illustrates an embodiment of pool configuration information.

FIG. 5 illustrates an embodiment of pool configuration information 500 that is used by the resource manager 12 to configure reserved pools for a type of super process. For each process level i capable of being invoked for a super process, the pool configuration information 500 includes a number of level i pools 502 to reserve for each process level i and a number of resources to allocate in each level i pool 504. The number of resources to allocate 504 in a level i pool may comprise a minimum number of resources needed for the level i process to complete without a deadlock. The pool configuration information 500 may be specific to a particular type of super process, such that different super processes may have a different number of levels and thus a different number of level i pools, and each of their level i pools may have a different number of resources to allocate for the level i pool.

Figure 6:
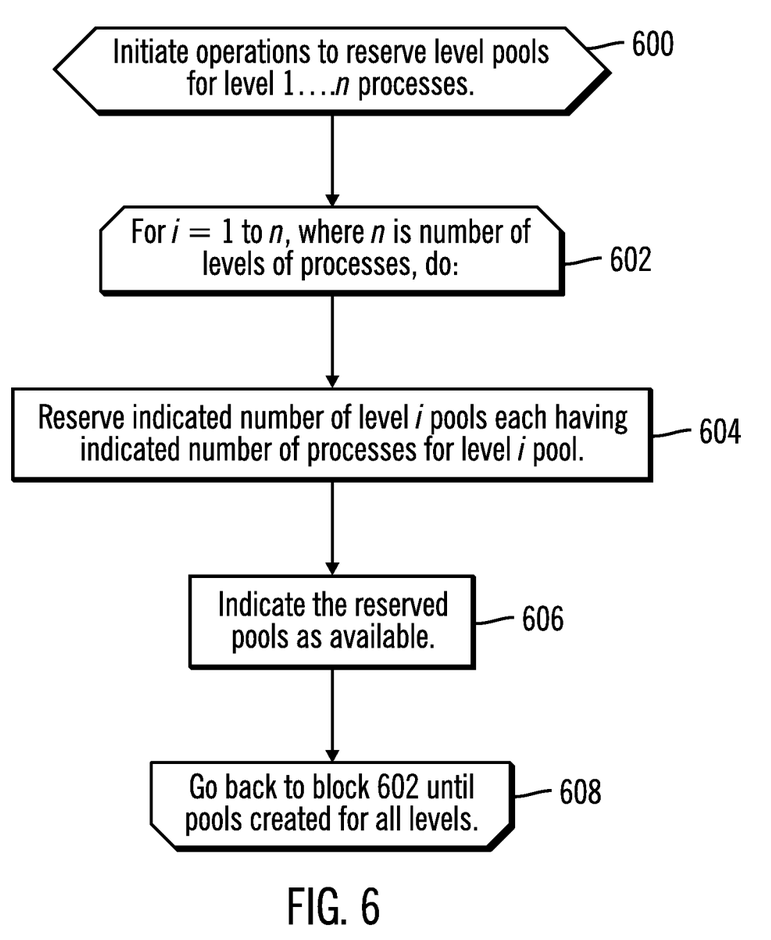
FIG. 6 illustrates an embodiment of operation to reserve pools of resources for a super process.

FIG. 6 illustrates an embodiment of operations performed by the resource manager 12 to configure reserved pools to use for super processes and their sub-processes. Upon initiating (at block 600) an operation to reserve pools, the resource manager 12 performs the operations at blocks 602-606 for each level of processes of the super process, where there are n levels of processes, and wherein n may be 2 or more. For the level i process, the resource manager 12 reserves (at block 604) the indicated number 502 of level i pools each having the indicated number 504 of resources for level i pools. An instance of pool information $300_i$ would be generated for each reserved level i pool. The assigned information 308 for each reserved level i pool would be initialized (at block 606) to indicate "available".

Figure 7:
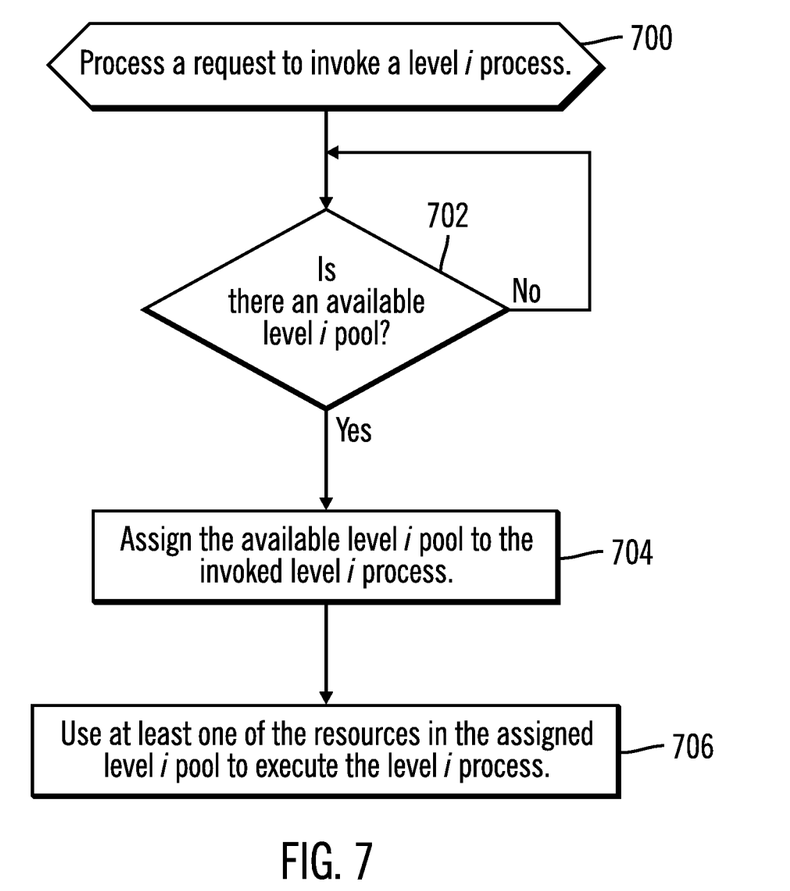
FIG. 7 illustrates an embodiment of operations to process a request to invoke a process.

FIG. 7 illustrates an embodiment of operations performed by the resource manager 12 to assign a level pool to a level i process being invoked. Upon processing (at block 700) a request to invoke a level i process, the resource manager 12 determines (at block 702) whether there is a level i pool $14_i$ available, i.e., having a status of 308 of unassigned. If not, then control proceeds back to block 702 to continue checking for an available level i pool $14_i$, which checks may occur after a delay. If (at block 702) there is an available level i pool $14_i$, then the resource manager 12 assigns (at block 704) the available level i pool to the invoked level i process, which may involve indicating the level i process identifier 402 in the assigned information 308 for the assigned level i pool $14_i$. Further, process information 400, would be created for the invoked level i process. The invoked level i process may use (at block 706) the resources 306 in the assigned level i pool $14_i$ to execute the level i process.

If the processes/sub-processes with assigned resources from a pool $14_i$ have all completed their operations and released the resources, then the assigned information 308 for the pool $200_i$ would be marked as unassigned and it becomes available for assignment to another (if any) level i process.

Described embodiments provide pools of resources for each of the possible levels of sub-processes for a super process. In this way, a pool having only the minimum number of resources needed for a sub-process to complete when the sub-process is invoked. This minimizes the number of resources assigned to a super-process because a pool of resources is only assigned when the sub-process is invoked. For super processes that may invoke a variable number of sub-processes, described embodiments optimize the assignment of pools by only assigning a pool for a sub-process when the sub-process is invoked. By leaving more pools of resources available for various levels of processes, described embodiments maximize the number of super processes and sub-processes that may concurrently execute, i.e., be assigned pools of resources.

Figure 8:
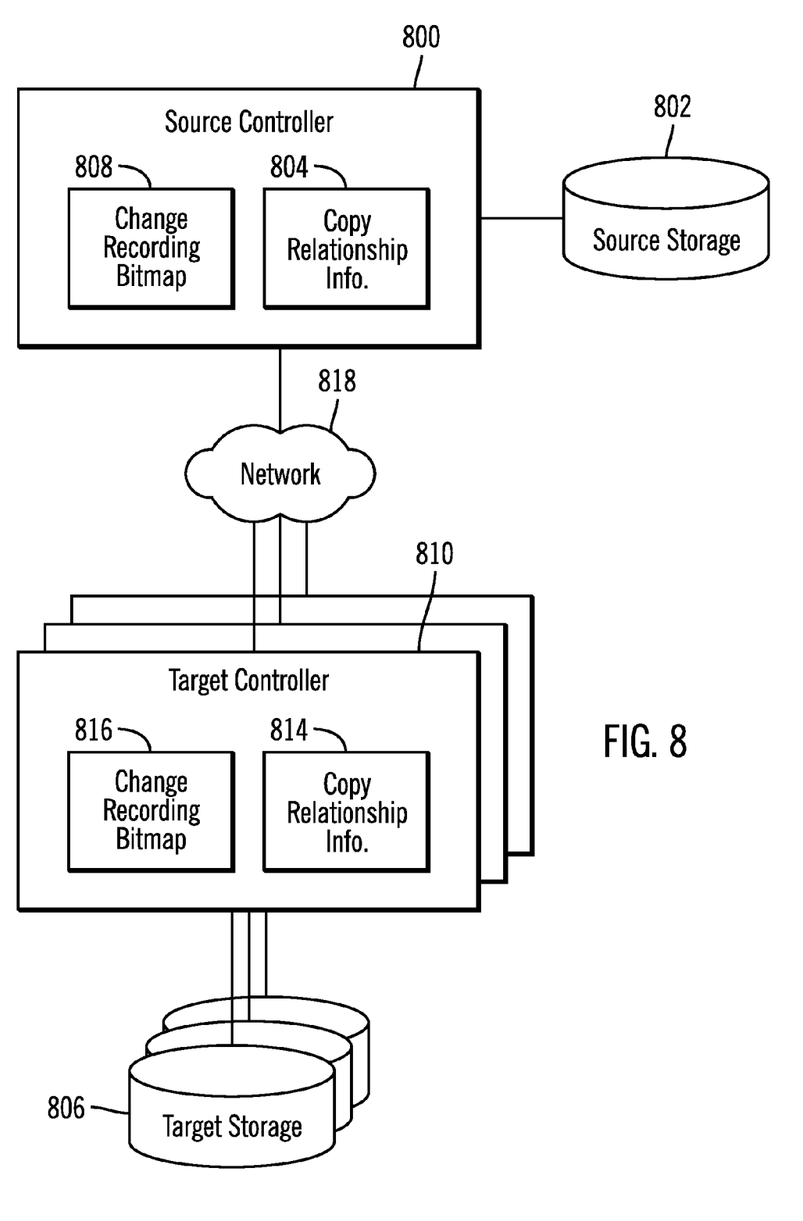
FIG. 8 illustrates an embodiment of a storage copy environment.

FIG. 8 illustrates a storage copy environment in which embodiments may be implemented. A source controller 800 manages I/O access to a source storage 802, and includes copy relationship information 804 on one or more target storages 806 to which data in the source storage 802 is replicated as part of a snapshot, FlashCopy®, or mirror copy operation. A change recording bitmap 808 includes information on data in the source storage 802 that is updated but not yet copied to the target storages 806 indicated in the copy relationship. Target controllers 810 manage I/O operations to target storages 812, and each target controller 810 includes a target instance of copy relationship 814 and change recording bitmap 816 comprising a target copy of the information 804 and 808. The source controller 800 communicates with target controllers 810 over a network 818.

In one embodiment, a write to the source storage 802 may comprise a super process and the write super process may spawn various sub-processes to carry out write related operations, such as sub-processes to update the change recording bitmaps 816 on the target controllers 810 managing the target storages 812 in a copy relationship with the updated source storage 802.

In this way, by dispatching a level 2 process, the higher level 1 process does not have to wait for lower process to complete before dispatching another one. In this case, level 1 process may trigger in parallel as many level 2 processes as the number of targets this source storage has. However, the level 1 process may wait for "operation status" from all dispatched level 2 processes before returning back to the supper process. This waiting time is minimized since work on all targets is done in parallel.

Figure 9:
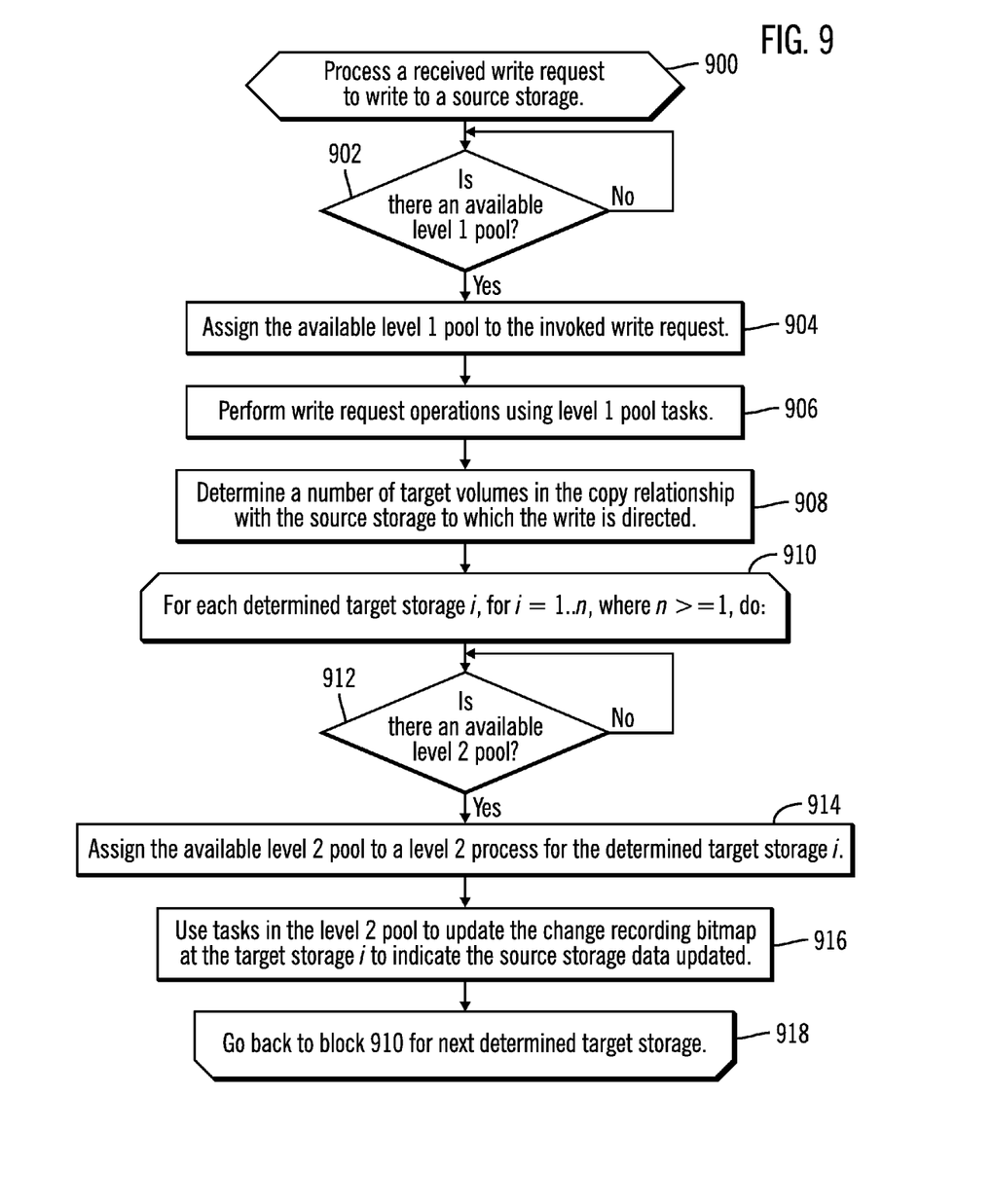
FIG. 9 illustrates an embodiment of operations to process a write request in the storage copy environment.

FIG. 9 illustrates an embodiment of operations performed by a resource manager 12 in the source controller 800 to process a received write request comprising a super process to process a write to source data in the source storage 802. Upon receiving (at block 900) a write request, if (at block 902) there is no level 1 pool $14_1$ available, then control returns to block 902 until one becomes available. If (at block 902) there is an available level 1 pool $14_1$, then the pool $14_1$ is assigned (at block 904) to the invoked write process. Multiple level 1 pools $14_1$ may be concurrently assigned to multiple write requests, level 1 write processes. The level 1 write process then performs level 1 write operations using the resources from the level 1 pool. The level 1 write process determines (at block 908) a number of target storages 806 in the copy relationship 804 with the source storage 802, such as a volume, etc., to which the write is directed. For each determined target storage i, for i=1 . . . n target storages 806, the resource manager 12 performs the operations at blocks 910-918. If (at block 912) there is no available level 2 pool $14_2$, then control proceeds back to block 812 to wait for an available level 2 pool $14_2$. Otherwise, if there is an available level 2 pool $14_2$, then the available level 2 pool $14_2$ is assigned (at block 914) to the level 2 process for the determined target storage i. The level 2 process for the determined target storage i uses (at block 916) resources in the level 2 pool $14_2$ to update the change recording bitmap 816 at the target storage i to indicate the source storage data that is updated. In this way, only the minimum number of level 2 pools are assigned/used based on the actual number of target storages in the copy relationship.

In certain implementations, a sub-process may require multiple level-2 pools. So after block 916, the higher level process may need to determine whether further level-2 pools are needed for further level 2 sub-processes, while the first level-2 pool is used by a sub-process. Further, a higher level process that dispatched a lower level sub-process may not wait until this dispatched lower level sub-process completes, but may instead continue with further higher level operations, such as dispatching additional sub-processes to perform operations, thus resulting in parallel processing. For instance, a higher level 1 process that is invoked to update the change recording bitmap 816 in the targets 810, does not have to wait until a first dispatched sub-process completes, but can dispatch one-by-one the sub-processes to update the change recording bitmap 816 for each of the targets 810 to provide for parallel processing. When the level 1 process receives complete from all the level 2 sub-processes, then the level 1 process can report to the super-process that the job has completed indicating that all the change recording bitmaps 816 on all targets 810 were updated.

Described embodiments divide a pool of resources into multiple pools for each of the different levels of sub-processes that may be invoked as part of a super process. When the number of sub-processes to be invoked at different levels is variable, described embodiments minimize the number of resources assigned to the sub-process level by only assigning a level pool for sub-processes that are invoked where the level pool for the sub-process has the minimum number of resources needed by a sub-process at the level. In this way, to avoid deadlocks, the pools of resources are divided into smaller subdivisions to minimize the number of resources that are assigned to sub-processes so that a pool of resources having the minimal number of resources needed is only assigned when the sub-process is invoked. In this way, deadlocks are avoided by assigning the minimum number of resources to a sub-process that are needed for the sub-process to complete while at the same time maximizing the number of pools of resources for a fixed number of resources available for a super process to allow more sub-processes of the super process to concurrently execute.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 10:
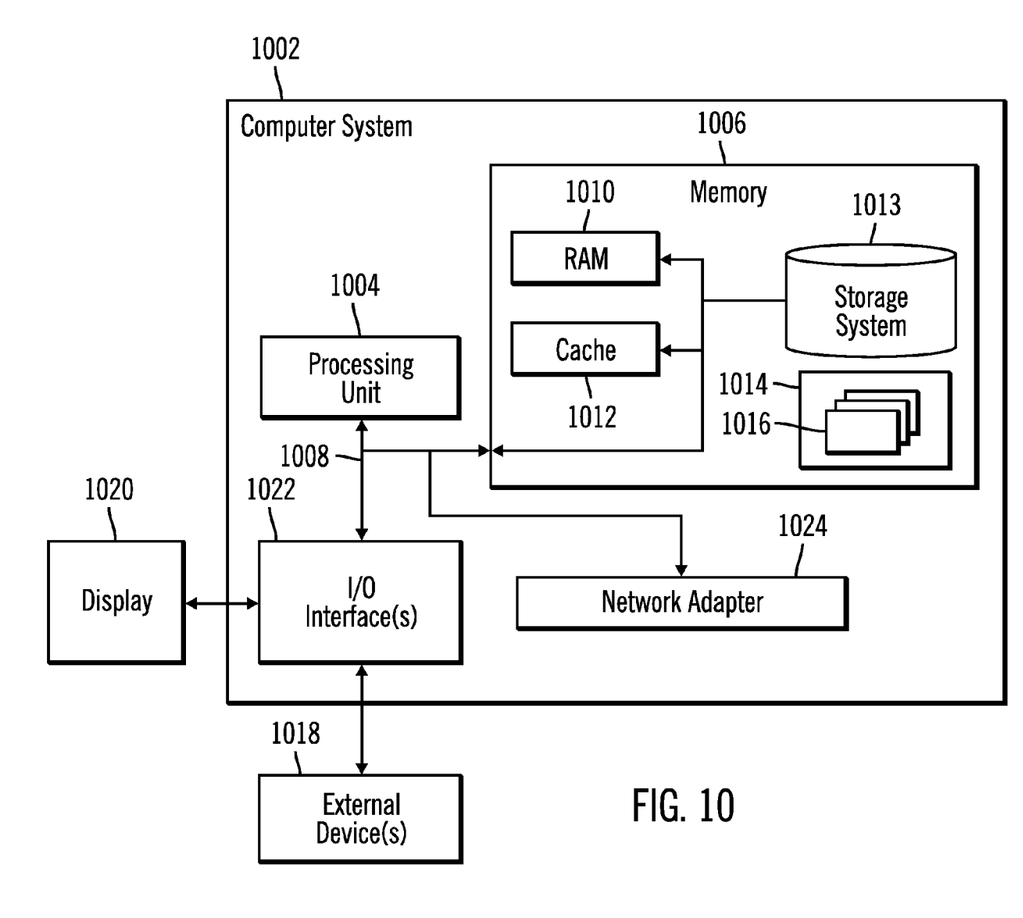
FIG. 10 illustrates an embodiment of a computing environment in which embodiments are implemented.

The computer 2, source controller 800, and target controller 810, and components therein, may be implemented in one or more computer systems, such as the computer system 1002 shown in FIG. 10. If the components of the network computing environment of FIG. 1 are implemented in multiple systems, then the systems may communicate over the network 4. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 1016 which generally carry out the functions and/or methodologies of embodiments of the invention as described herein.

Computer system/server 1002 may also communicate with one or more external devices 1018 such as a keyboard, a pointing device, a display 1020, etc.; one or more devices that enable a user to interact with computer system/server 12; and/or any devices (e.g., network card, modem, etc.) that enable computer system/server 1002 to communicate with one or more other computing devices. Such communication can occur via Input/output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for assigning resources to processes invoked in an operating system, the computer program product comprising a non-transitory computer readable storage medium having computer readable program code embodied therein that executes to perform operations, the operations comprising:
   providing a copy relationship to copy data from a source volume to a target volume;
   reserving a plurality of first level pools of resources in the operating system for first level processes invoked in the operating system, wherein each of the first level processes are invoked to write data to the source volume that is in the copy relationship with the target volume, wherein each of the first level processes are capable of invoking at least one second level process to update a change recording bitmap for the target volume to indicate an update to the source volume, wherein one of the first level pools of resources assigned to one of the first level processes is released and available to assign to another first level process when the first level process completes the writing of data to the source volume; and
   reserving a plurality of second level pools of resources in the operating system for second level processes invoked in the operating system by the first level processes, wherein one of the second level pools of resources assigned to one of the second level processes is released and available to assign to another second level process when the second level process completes the updating the change recording bitmap.

2. The computer program product of claim 1, wherein each of the first level pools reserves a first number of resources for assignment to one of the first level processes comprising a minimal number of resources needed by one of the first level process to complete and wherein each of the second level pools reserves a second number of resources comprising a minimal number of resources needed by one of the second level process to complete.

3. The computer program product of claim 1, wherein the operations further comprise:
   invoking a new first level process to write data to the source volume that is in the copy relationship;
   determining whether there is one available first level pool of the first level pools not assigned to one of the first level processes; and
   assigning the determined available first level pool to the new first level process.

4. The computer program product of claim 3, wherein the operations further comprise:
   assigning one of the first level pools to the new first level process after one of the first level pools becomes available when one of the first level processes completes the the writing of data to the source volume in response to determining that there is no available first level pool.

5. The computer program product of claim 4, wherein the operations further comprise:
   assigning one of the second level pools to the new second level process after one of the second level pools becomes available when one of the second level processes completes the updating the change recording bitmap in response to determining that there are no available second level pools.

6. The computer program product of claim 1, wherein the operations further comprise:
   initiating, by one of the first level processes, a new second level process to perform the updating the change recording bitmap for the first level process;
   determining by a first level process in one of the first level pools assigned to one of the first level processes whether there is one available second level pool not assigned to one of the second level processes for the new second level process;
   assigning the determined available second level pool to the new second level process.

7. The computer program product of claim 6, wherein one of the second level pools is available for any second level process when one of the second level processes invoked by any of the first level processes completes the updating the change recording bitmap.

8. The computer program product of claim 1, wherein multiple first level processes can concurrently execute resources from the first level pools, and wherein each first level process is enabled to invoke in parallel a second level process for each target volume to which the data is copied from the source volume.

9. The computer program product of claim 1, wherein the reserving the plurality of the first level pools of resources and the second level pools of resources are performed by a resource manager of the operating system.

10. A computer program product for assigning resources to processes invoked in an operating system, the computer program product comprising a non-transitory computer readable storage medium having computer readable program code embodied therein that executes to perform operations, the operations comprising:
    performing for each level i process invoked in the operating system, for i equals 1 through n levels of processes, where n is at least two:
      providing a copy relationship to copy data from a source volume to a target volume; and
      reserving a plurality of level i pools of resources in the operating system for level i processes, wherein each of the level i processes are invoked to write data to a source volume that is in a copy relationship with at least one target volume, wherein each of the level i processes, for i equals 1 through (n−1) are capable of invoking at least one level (i+1)th process to update a change recording bitmap for the target volume to indicate an update to the source volume that is a sub-operation of the level i operation, wherein one of the level i pools of resources assigned to one of the level i processes is released and available to assign to another level i process when the writing of data to the source volume completes the level i operation for which it was invoked.

11. The computer program product of claim 10, wherein the operations of reserving the plurality of the level i pools of resources are performed by a resource manager of the operating system.

12. A system, comprising:
   a processor;
   a computer readable storage medium including a program executed by the processor to perform operations to assign resources to processes invoked in an operating system, the operations comprising:

providing a copy relationship to copy data from a source volume to a target volume; and reserving a plurality of first level pools of resources in the operating system for first level processes invoked in the operating system, wherein each of the first level processes are invoked to write data to the source volume that is in the copy relationship with the target volume, wherein each of the first level processes are capable of invoking at least one second level process to update a change recording bitmap for the target volume to indicate an update to the source volume wherein one of the first level pools of resources assigned to one of the first level processes is released and available to assign to another first level process when the first level process completes the writing of data to the source volume; and reserving a plurality of second level pools of resources in the operating system for second level processes invoked in the operating system by the first level processes, wherein one of the second level pools of resources assigned to one of the second level processes is released and available to assign to another second level process when the second level process completes the updating the change recording bitmap.

13. The system of claim 12, wherein each of the first level pools reserves a first number of resources for assignment to one of the first level processes comprising a minimal number of resources needed by one of the first level process to complete and wherein each of the second level pools reserves a second number of resources comprising a minimal number of resources needed by one of the second level process to complete.

14. The system of claim 12, wherein the operations further comprise:

invoking a new first level process to write data to the source volume that is in the copy relationship;

determining whether there is one available first level pool of the first level pools not assigned to one of the first level processes; and assigning the determined available first level pool to the new first level process.

15. The system of claim 12, wherein the operations further comprise:

initiating, by one of the first level processes, a new second level process to perform the updating the change recording bitmap for the first level process;

determining by a first level process in one of the first level pools assigned to one of the first level processes whether there is one available second level pool not assigned to one of the second level processes for the new second level process;

assigning the determined available second level pool to the new second level process.

16. The system of claim 12, wherein multiple first level processes can concurrently execute resources from the first level pools, and wherein each first level process is enabled to invoke in parallel a second level process for each target volume to which the data is copied from the source volume.

17. The system of claim 12, wherein the reserving the plurality of the first level pools of resources and the second level pools of resources are performed by a resource manager of the operating system.

18. A method for assigning resources to processes invoked in an operating system, comprising:

providing a copy relationship to copy data from a source volume to a target volume;

reserving a plurality of first level pools of resources in the operating system for first level processes invoked in the operating system, wherein each of the first level processes are invoked to write data to the source volume that is in the copy relationship with the target volume, wherein each of the first level processes are capable of invoking at least one second level process to update a change recording bitmap for the target volume to indicate an update to the source volume, wherein one of the first level pools of resources assigned to one of the first level processes is released and available to assign to another first level process when the first level process completes the writing of data to the source volume; and reserving a plurality of second level pools of resources in the operating system for second level processes invoked in the operating system by the first level processes, wherein one of the second level pools of resources assigned to one of the second level processes is released and available to assign to another second level process when the second level process completes the updating the change recording bitmap.

19. The method of claim 18, wherein each of the first level pools reserves a first number of resources for assignment to one of the first level processes comprising a minimal number of resources needed by one of the first level process to complete and wherein each of the second level pools reserves a second number of resources comprising a minimal number of resources needed by one of the second level process to complete.

20. The method of claim 18, further comprising:

invoking a new first level process to write data to the source volume that is in the copy relationship;

determining whether there is one available first level pool of the first level pools not assigned to one of the first level processes; and assigning the determined available first level pool to the new first level process.

21. The method of claim 18, further comprising:

initiating, by one of the first level processes, a new second level process to perform the updating the change recording bitmap for the first level process;

determining by a first level process in one of the first level pools assigned to one of the first level processes whether there is one available second level pool not assigned to one of the second level processes for the new second level process;

assigning the determined available second level pool to the new second level process.

22. The method of claim 18, wherein multiple first level processes can concurrently execute resources from the first level pools, and wherein each first level process is enabled to invoke in parallel a second level process for each target volume to which the data is copied from the source volume.

23. The method of claim 18, wherein the reserving the plurality of the first level pools of resources and the second level pools of resources are performed by a resource manager of the operating system.

\* \* \* \* \*